US 8,639,208 B2
Jan. 28, 2014

(12) United States Patent
Ruggerio

(10) Patent No.: US 8,639,208 B2
(45) Date of Patent: Jan. 28, 2014

(54) CELLULAR TELEPHONE WITH AUTOMATIC REDIAL CAPABILITY

(75) Inventor: Raymond L. Ruggerio, Glenview, IL (US)

(73) Assignee: Alcatel Lucent, Paris (FR)

( * ) Notice: Subject to any disclaimer, the term of this patent is extended or adjusted under 35 U.S.C. 154(b) by 1263 days.

(21) Appl. No.: 11/899,347

(22) Filed: Sep. 5, 2007

(65) Prior Publication Data

US 2009/0061813 A1 Mar. 5, 2009

(51) Int. Cl.
*H04M 11/04* (2006.01)
*H04L 12/58* (2006.01)
*H04B 1/38* (2006.01)
*H04B 7/00* (2006.01)

(52) U.S. Cl.
USPC .............. 455/404.1; 455/412.1; 455/564; 455/510; 455/567; 379/357.04

(58) Field of Classification Search
USPC ................... 455/404.1, 412.1, 564
See application file for complete search history.

(56) References Cited

U.S. PATENT DOCUMENTS

| 5,644,624 | A * | 7/1997 | Caldwell ................... 379/69 |
| 6,819,945 | B1 * | 11/2004 | Chow et al. ................ 455/567 |
| 8,126,491 | B1 * | 2/2012 | Choi-Grogan ............. 455/510 |
| 2002/0065063 | A1 * | 5/2002 | Uhlik et al. ............... 455/404 |
| 2006/0203995 | A1 * | 9/2006 | Tan et al. ............... 379/357.04 |
| 2008/0076382 | A1 * | 3/2008 | Girard et al. ............ 455/404.1 |

* cited by examiner

*Primary Examiner* — Timothy Pham
(74) *Attorney, Agent, or Firm* — Carmen Patti Law Group, LLC

(57) ABSTRACT

A mobile device and method in one example for automatically redialing a dialed number when a call has failed is provided. The mobile device stores the dialed number when the call is initially being placed. If the call fails, the mobile device determines if a call retry service should be invoked. If so, the mobile device determines whether a call retry system has already been enabled. If the call retry system has been enabled, the mobile device will continually and automatically call the dialed number until a terminating party at the dialed number answers or a selectable time limit has expired. When the terminating party answers the call, the mobile device rings so that a subscriber of the mobile device may answer the ring and connect the call. The mobile device may also detect if the dialed number is an emergency number or non-emergency number. A recorded message recorded by the subscriber may be automatically played to the terminating party if the subscriber does not answer the ring. Alternatively, or in addition to, a default recorded message may be played to the terminating party if the subscriber does not answer the ring.

18 Claims, 6 Drawing Sheets

CELLULAR TELEPHONE WITH AUTOMATIC REDIAL CAPABILITY

TECHNICAL FIELD

The present invention is directed to telecommunications systems and especially to a system and method which automatically attempts to establish a call from a cellular telephone that failed.

BACKGROUND

In recent years the use of mobile phones has become more common. As mobile phone use has become more common, people are more frequently using their mobile phones to contact friends, business associates, family members, and emergency services. Unfortunately, mobile phone users are sometimes confronted with failed calls when attempting to contact another party.

Mobile phone calls may fail for one of any number of reasons including lack of service, cell site unavailability, or a lack of radio frequency coverage. When a subscriber places a non-emergency mobile phone call that fails, it would be convenient for a subscriber to be able to automatically reconnect and leave a voice message for the intended party. This need is heightened when the subscriber places an emergency call. If the emergency call is made because of a medical emergency, the subscriber may become incapacitated before service is available to complete the call. If the subscriber becomes incapacitated between the times the call fails and the service is restored, the subscriber will not be able to reinitiate the emergency call. The subscriber is therefore unable to notify the proper authorities and may consequently be unable to obtain emergency assistance.

Thus a need exists to provide a way to leave a voice message and automatically connect a call when a wireless phone call fails. A further need exists to provide emergency assistance access from a wireless phone when an initial emergency call fails. There is a further need to provide emergency assistance access from a wireless phone when an initial emergency call fails and the subscriber subsequently is unable to redial the emergency assistance number.

SUMMARY

The invention in one implementation encompasses a method of attempting to connect a failed call from a mobile device, the method comprising the steps of storing a dialed number of the failed call; determining if a call retry service should be invoked; and attempting to connect the failed call by automatically redialing the dialed number if the call retry service is invoked. The method may further comprise the steps of determining whether the dialed number is an emergency number; and determining whether an emergency retry service should be invoked if the dialed number is an emergency number. The dialed number may be determined to be an emergency number by comparing the dialed number and a list of emergency numbers, and indicating an emergency number has been dialed when there is a match between the dialed number and a number in the list of emergency numbers.

The invention in one implementation encompasses a mobile device for placing a call comprising a user interface for inputting a dialed number by a subscriber. A call failure detector determines whether the call to the dialed number failed. A call retry service detector determines whether a call retry service is enabled. A call generator repeatedly generates a call to the dialed number in response to the call retry service detector.

The mobile device may further comprise an emergency call memory for storing a list of emergency numbers. A comparator compares the list of emergency numbers to the dialed number and determines whether the dialed number is one of the list of emergency numbers. The call retry service detector may comprise an emergency retry service detector which determines whether the emergency retry service is enabled. The mobile device may further comprise an emergency retry service rejection detector for prompting whether a subscriber of the mobile device wishes to reject the emergency retry service and for determining whether the emergency retry service is rejected. The call retry service detector may comprise a non-emergency retry service detector for determining whether a non-emergency retry service is enabled.

A further implementation of the invention encompasses a system for attempting to connect a call that has failed. The system comprises a mobile device for calling a dialed number, for storing a list of emergency numbers, for determining whether the call to the dialed number has failed, and for automatically redialing the dialed telephone number if the dialed telephone number is on the list of emergency numbers and the call has failed. A call receive system receives the call from the mobile device. The mobile device may further comprise a message recorder for recording a recorded message, a message memory for storing the recorded message; and a message player for repeatedly playing the recorded message when the call is completed to the dialed number.

DESCRIPTION OF THE DRAWINGS

Features of example implementations of the invention will become apparent from the description, the claims, and the accompanying drawings in which:

DETAILED DESCRIPTION

Figure 1:
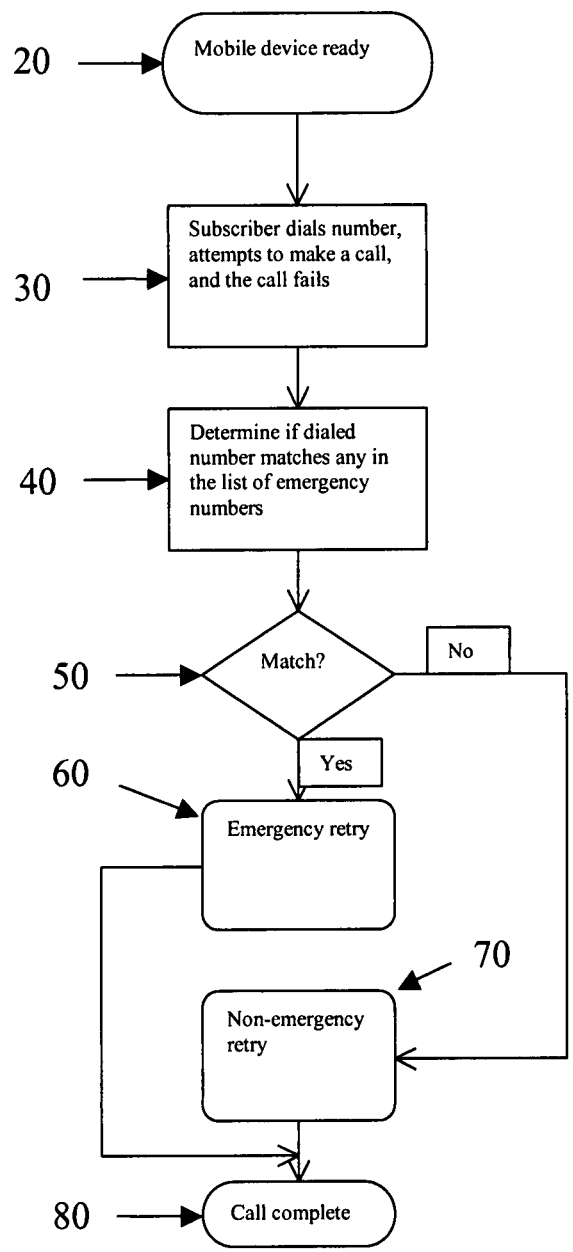
FIG. 1 is a representation of one implementation of a call retry method that comprises determining if an emergency number is dialed and determining if an emergency retry service should be invoked, or if a non-emergency retry service should be invoked.

Turning to FIG. 1, a call retry method 10 in one example for detecting when a call has failed, for determining if a non-emergency number or an emergency number has been dialed and determining if an emergency retry service or a non-emergency retry service should be invoked. An illustrative description of the call retry method 10 is presented for explanatory purposes.

A wireless, or mobile, device begins in a ready state 20. In this state the mobile device may attempt to initiate a call or receive a call. It will be apparent to one of skill in the relevant art that a mobile device may be a cellular phone, a satellite phone or any other electronic device that has the capability to make a wireless call. The subscriber attempts to make a call 30 to a telephone number. The call fails 30 for any number of reasons. For example, the call may fail because the mobile device is not in radio frequency coverage of a telecommunications network, there may be a radio frequency anomaly that prevents the mobile device from receiving sufficient signal strength from the telecommunications network, or the telecommunications network may be temporarily unavailable. These are examples of why an attempted call may fail. It will be readily apparent to those skilled in the relevant art that this is not an exhaustive list of why a call may fail and that there are numerous other reasons why a call may fail.

The telephone number dialed, i.e. the dialed number, of the failed call is compared with a list of emergency telephone numbers 40. The call retry method 10 then determines whether a call retry method should be invoked, and more particularly, whether an emergency retry method or a non-emergency retry method should be invoked. For purposes of this disclosure the call retry method comprises the emergency retry method and the non-emergency retry method. If the dialed number matches an entry in the list of emergency telephone numbers 50, an emergency retry method is invoked 60. If the dialed number does not match any entry in the list of emergency numbers 50, then a non-emergency retry method 70 is invoked. The entries in the list of emergency numbers may be any designations which are sufficient to identify whether the dialed number is an emergency or non-emergency number. The entries may for example be actual emergency telephone numbers or other designations which map to emergency telephone numbers. Once the emergency retry method 60 establishes communications with the dialed number, the call retry method 10 enters the call complete state 80. Similarly, once the non-emergency retry method 70 establishes communications with the dialed number, the call retry method 10 enters a call complete state 80.

Figure 2:
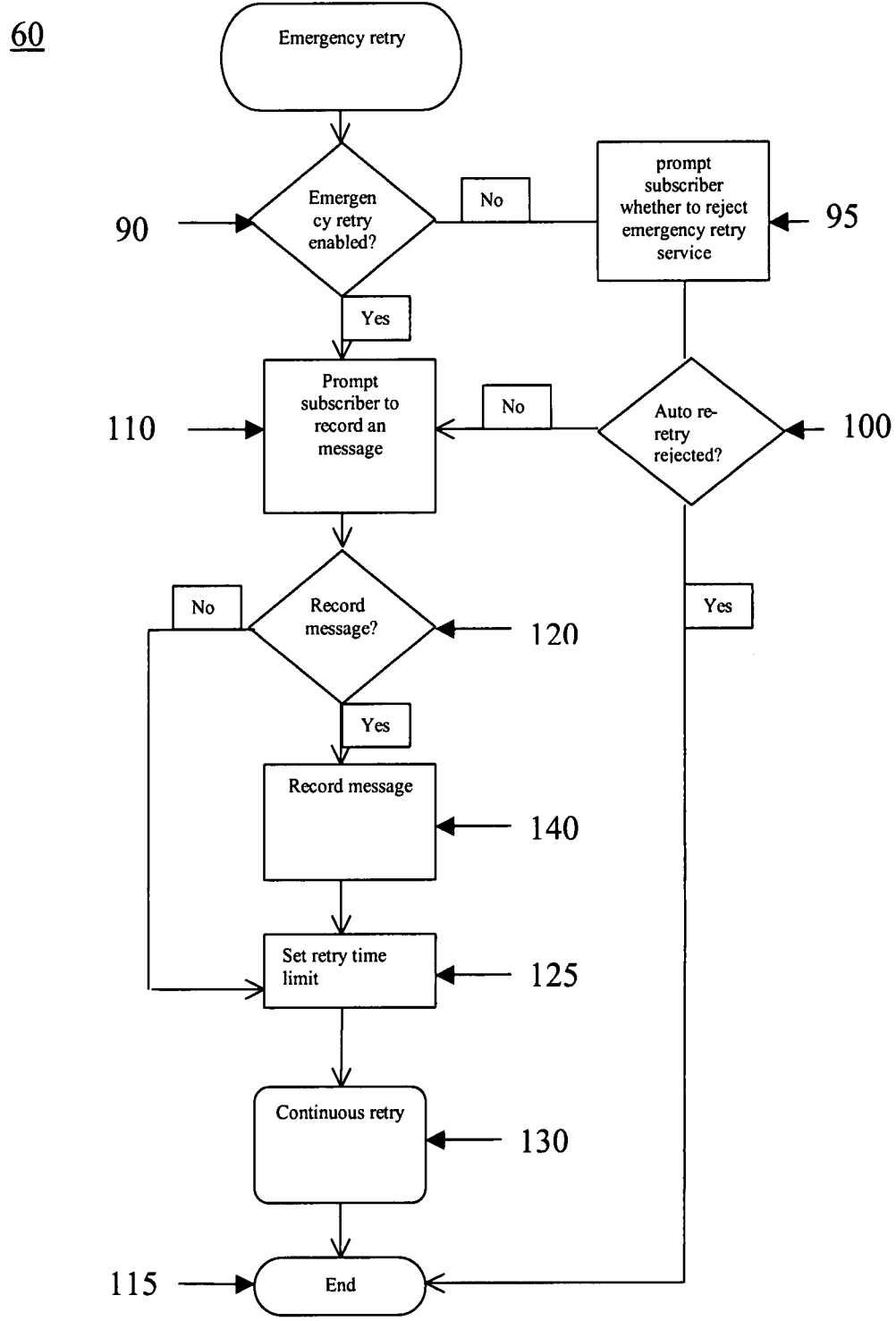
FIG. 2 is a representation of one implementation of a method for retrying an emergency call.

Turning to FIG. 2, an illustrative description of an emergency retry method 60 is presented for explanatory purposes. In performing an emergency retry, the emergency retry method 60 determines if the emergency retry service is enabled 90. If the emergency retry service is not enabled, then the emergency retry method 60 prompts the subscriber whether to reject the emergency retry service 95. If the subscriber rejects the emergency retry service 100, the emergency retry method 60 ends 115. If the subscriber does not reject the emergency retry service 100 or the emergency retry service is enabled at 90, the emergency retry method 60 prompts the subscriber whether to record an emergency message 110.

If the subscriber chooses not to record an emergency message 120, a retry time limit is set 125 and the continuous retry method is invoked 130. The retry time limit is a time duration during which the mobile device is allowed to try to connect a failed call. Once this time limit is exceeded, the mobile device stops attempting to connect the failed call. In the case of an emergency call, such as an emergency call performed by the emergency retry method 60, the mobile device may try to connect the call without time limits. The value of the retry time limit in the emergency retry method 60 is set to an initial value which indicates that there is no time limit to establishing the emergency call. For example, the time limit could be initialized to 0 to indicate there is no time limit to establishing the call. If the subscriber chooses to record an emergency message 120, the emergency message is recorded 140, the retry time limit is set 125, and the continuous retry method is invoked 130.

Figure 3:
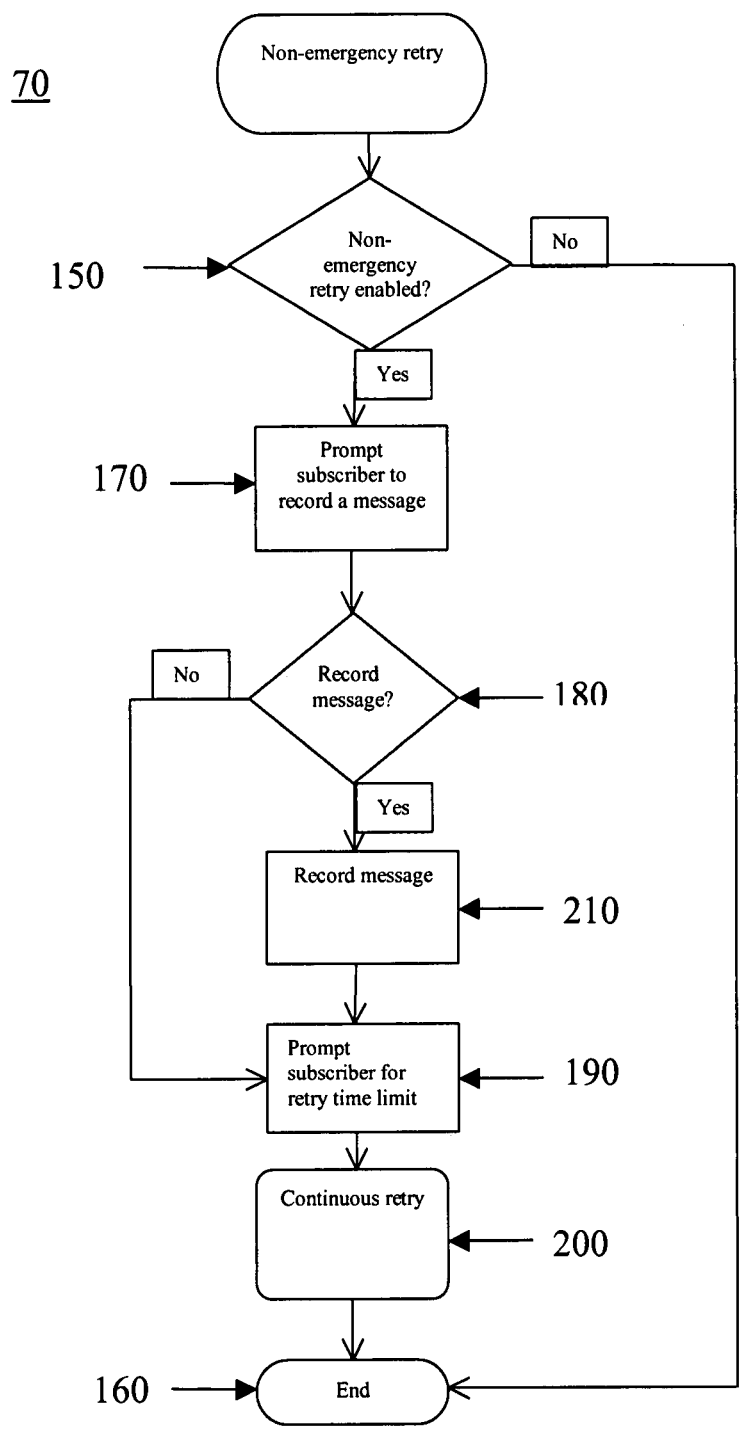
FIG. 3 is a representation of one implementation of a method for retrying a non-emergency call.

Turning to FIG. 3, an illustrative description of a non-emergency retry method 70 is presented for explanatory purposes. In performing a non-emergency retry, the non-emergency retry method 70 determines if the non-emergency retry service is enabled 150. If the non-emergency retry service is not enabled 150, the non-emergency retry method ends 160. If the non-emergency retry service is enabled 150, the non-emergency retry method 70 prompts the subscriber whether to record a message 170.

If the subscriber chooses not to record a message 180, the subscriber is prompted for a retry time limit 190, and the continuous retry method 200 is invoked. If the subscriber chooses to record a message 180, the message is recorded 210, the subscriber is prompted for a retry time limit 190, and the continuous retry method 200 is invoked.

Figure 4:
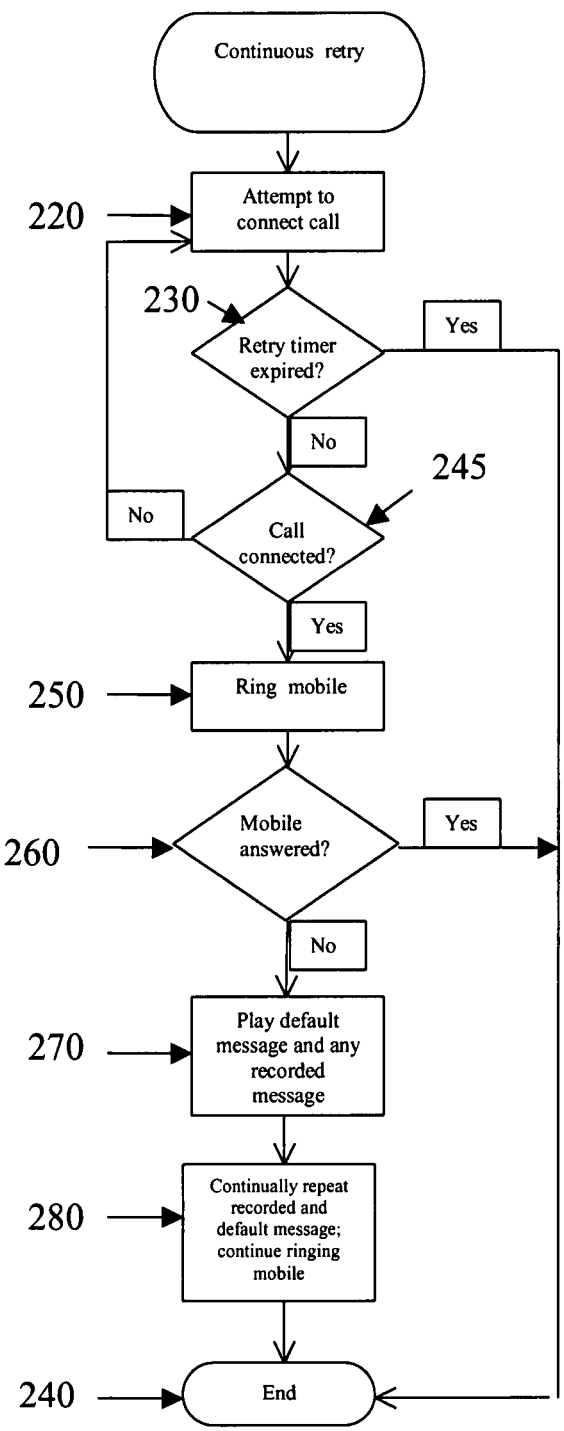
FIG. 4 is a representation of one implementation of a method for continuously trying to connect a wireless call until a call connection is made.

Turning to FIG. 4, an illustrative description of the continuous retry method 200 is presented for explanatory purposes. The mobile device attempts to establish a call 220. The mobile device may decide to attempt to establish a call by originating a call upon a successful registration attempt. Alternatively, the mobile device may decide to attempt to establish a call based on the expiration of a timer mechanism. Using the registration process or timer mechanism is only two of many ways the mobile device may decide to attempt to establish an emergency call. Upon attempting to connect the call 220, the continuous retry method 200 determines if the retry timer has expired 230. If the retry timer has expired 230 the continuous retry method ends 240. If the retry timer has not expired 230 the continuous retry method 200 determines if the call is connected 245 to the terminating party. Those of ordinary skill in the art would readily appreciate that the terminating party is the party that is called by the party that is originating the call. If the call is not connected 245 the continuous retry method attempts to connect the call again 220.

Once the call is connected 245 to the terminating party, the continuous retry method 200 rings the mobile 250. If the subscriber answers the mobile 260 the continuous retry method 200 ends 240. When the subscriber answers the ringing mobile device, the mobile device stops ringing, and the subscriber talks to the terminating party.

If the subscriber does not answer the mobile device 260, the mobile device plays a default message to the terminating party 270. If the subscriber recorded a message, the recorded message is played to the terminating party or, alternatively, the recorded message is played along with the default message 270. The default message and the recorded message are repeated 280 until either the subscriber answers the ringing mobile device or the terminating party disconnects the call.

Figure 5:
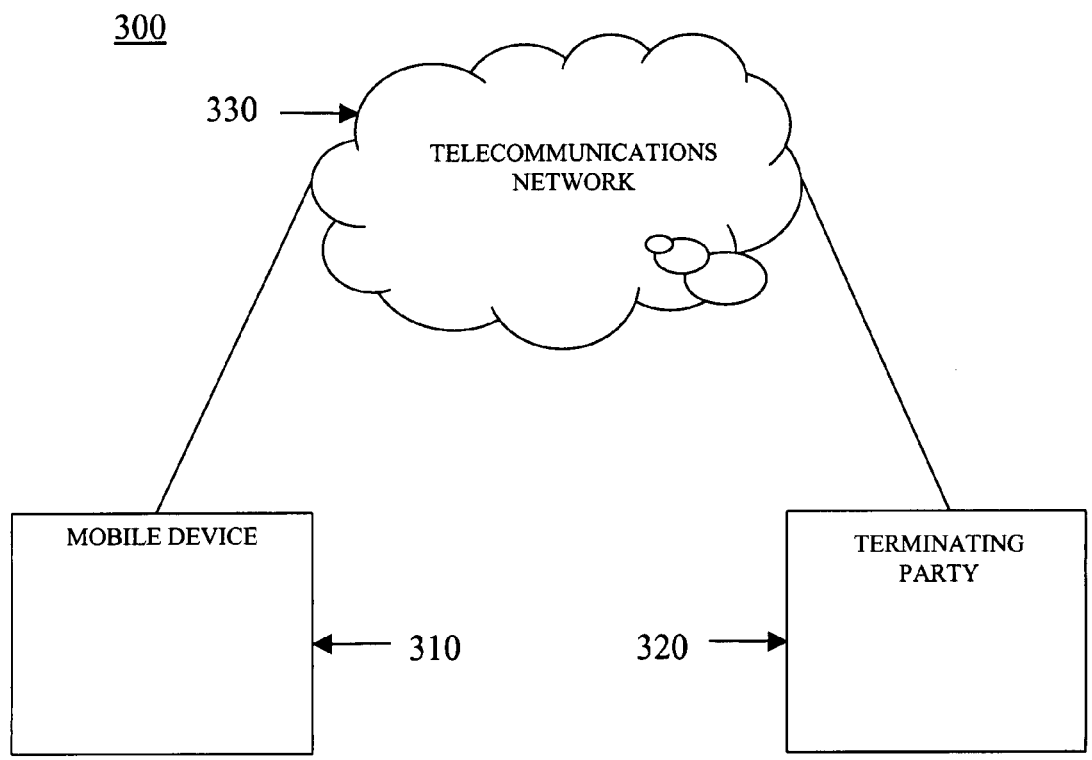
FIG. 5 is a functional block diagram of an embodiment of a telecommunications network with a wireless device used to retry an emergency call.

Turning to FIG. 5, an exemplary block diagram 300 comprises a mobile device 310 communicatively connected to a terminating party 320 via a telecommunications network 330. The subscriber uses the mobile device 310 to attempt a call to the terminating party 320 via the telecommunications network 330. It will be readily apparent to one of ordinary skill in the applicable art that the invention may be practiced with any number of telecommunications networks.

Figure 6:
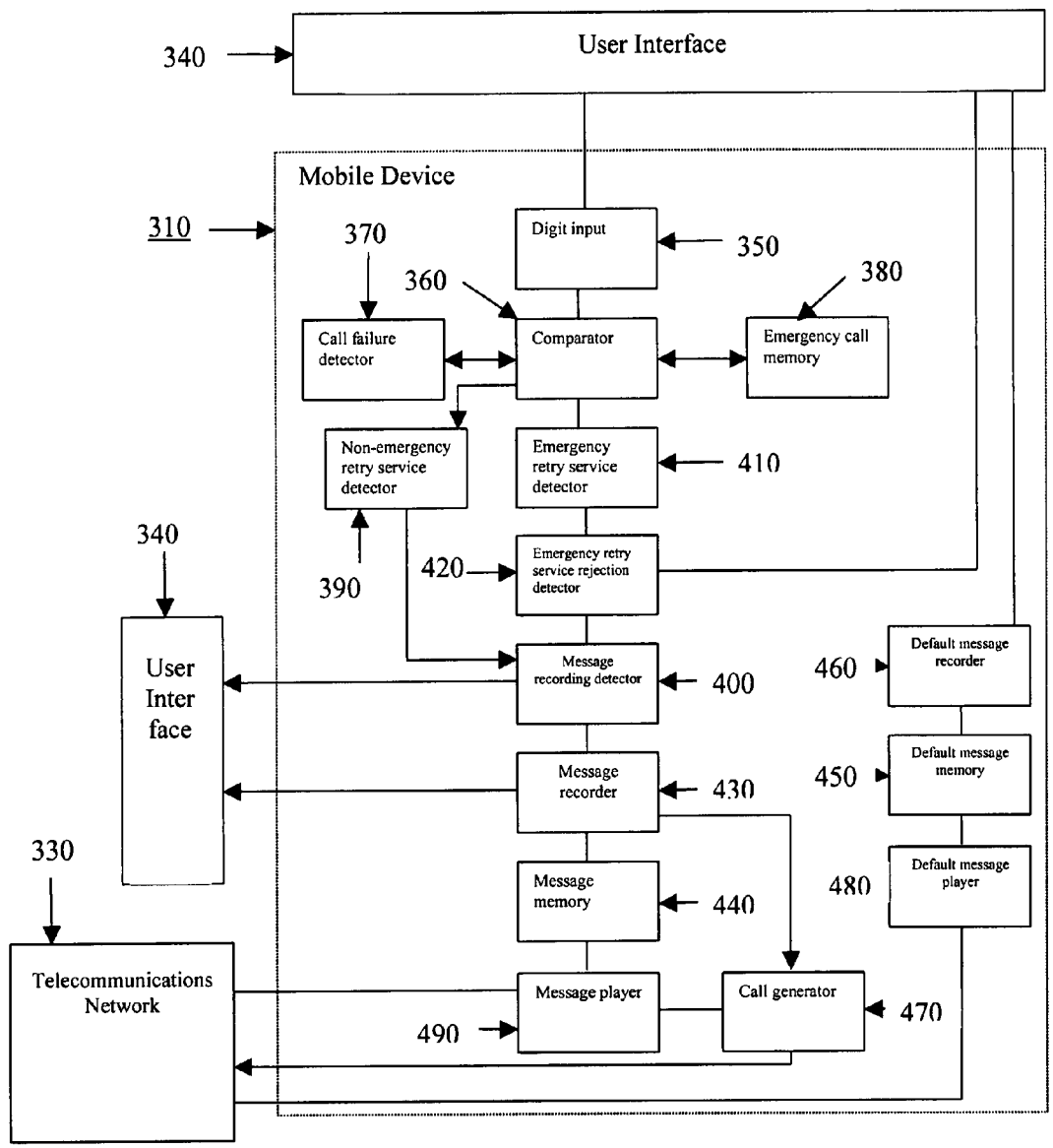
FIG. 6 is a functional block diagram of an embodiment of a wireless device used to retry an emergency call.

Finally turning to FIG. 6, an illustrative description of the mobile device 310 is shown for explanatory purposes. A user interface 340 is a device used to retrieve information and output information to the subscriber. The user interface 340 may be, for example, comprised of one or more of a key-pad input, a screen, a microphone, or a speaker. The screen or speaker may be used to output information to the subscriber while the key-pad or microphone may be used by the subscriber to input information into the mobile device 310. The subscriber enters a dialed number into a digit input 350 via the user interface 340. The digit input 350 passes the dialed number to a comparator 360.

The comparator 360 stores the dialed number while the mobile device 310 attempts to establish a call. A call failure detector 370 signals the comparator 360 when a call attempt has failed. The comparator 360 then compares the dialed number against a list of emergency numbers contained in an emergency call memory 380. If the dialed number does not match a telephone number in the emergency call memory 380, the comparator 360 notifies a non-emergency retry service detector 390 that a non-emergency number was dialed. If the non-emergency retry service is enabled, the non-emergency retry detector 390 informs a message recording detector 400 that the subscriber invoked the non-emergency retry service. If the dialed number matches a telephone number in the emergency call memory 380 the comparator 360 notifies an emergency retry service detector 410 that a match occurred. The emergency retry service detector 410 determines whether the emergency retry service is enabled and provides an emergency retry service rejection detector 420 with the enablement status of the emergency retry service. The emergency retry service rejection detector 420 prompts the subscriber whether to reject the emergency retry service. If the subscriber does not reject the emergency retry service, then the emergency retry service rejection detector 420 notifies the message recording detector 400 that the subscriber invoked the emergency retry service.

The message recording detector 400 then prompts the subscriber if a message should be recorded. If the subscriber decides to record a message a message recorder 430 is notified. The subscriber enters a voice message via the user interface 340 to the message recorder 430 which stores the message in a message memory 440.

A default message may be stored in a default message memory 450. The default message memory 450 may hold an emergency default message and a non-emergency default message. These messages may be pre-programmed into the default message memory 450, or they may be entered via the user interface 340 by the manufacturer, service provider or other vendor of the mobile device. A default message recorder 460 records the default messages and stores them in the default message memory 450.

The message recorder 430 notifies a call generator 470 when it has finished recording a message from the subscriber. The call generator 470 attempts to establish a call after an initial call fails. The attempt to successfully establish the call may be associated with a successful registration of the mobile device, with the expiration of a timer, or when adequate signal strength is detected by the mobile device 310. When the call generator 470 determines that a call to the terminating party has been successfully established, the call generator 470 notifies a default message player 480 and a recorded message player 490. The default message player 480 plays the default emergency message to the terminating party 320. If there is a recorded message in the message memory 440, the message player 490 plays the recorded message to the terminating party 320. Either of the default message or the recorded message may be played to the terminating party 320 or, alternatively, both the default message and the recorded message may be played to the terminating party 320.

The mobile device 310 in one example employs one or more computer-readable signal-bearing media. The computer-readable signal-bearing media store software, firmware and/or assembly language for performing one or more portions of one or more implementations of the invention. Examples of a computer-readable signal-bearing medium for the mobile device 310 may comprise recordable data storage medium of the message memory 450 and the default message memory 460. The computer-readable signal-bearing medium for the mobile device 410 in one example comprise one or more of a magnetic, electrical, optical, biological, and atomic data storage medium. For example, the computer-readable signal-bearing medium may comprise floppy disks, magnetic tapes, CD-ROMs, DVD-ROMs, hard disk drives, and electronic memory.

The steps or operations described herein are just for example. There may be many variations to these steps or operations without departing from the spirit of the invention. For instance, the steps may be performed in a differing order, or steps may be added, deleted, or modified.

Although example implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims. For example, a number of the steps described herein may be implemented in software or hardware or any combination thereof.

I claim:

1. A method of attempting to connect a failed wireless call from a mobile device, the method comprising the steps of:
   storing a dialed number of the failed wireless call in the mobile device;
   comparing a list of emergency numbers to the dialed number and determining whether the dialed number is one of the list of emergency numbers;
   determining whether a call retry service is enabled, including determining whether an emergency retry service is enabled;
   when the dialed number is one of the list of emergency numbers and the emergency retry service is enabled, prompting whether a subscriber of the mobile device wishes to reject the emergency retry service and determining whether the emergency retry service is rejected; and
   when the dialed number is one of the list of emergency numbers, and the emergency retry service is enabled and not rejected, attempting to connect the failed wireless call by automatically redialing the dialed number from the mobile device.

2. The method of claim 1 wherein the step of comparing further comprises the step of provisioning the mobile device with the list of emergency numbers.

3. The method of claim 1 wherein the step of comparing further comprises the step of downloading the mobile device with the list of emergency numbers.

4. The method of claim 1 wherein the step of determining whether an emergency retry service should be invoked further comprises the steps of:
   if the emergency retry service is enabled, prompting the subscriber whether to record a message;
   recording the message if the subscriber chooses to record; and
   playing the message upon connection of the failed wireless call.

5. The method of claim 4 further comprising the step of setting a retry time limit during which the mobile device attempts to connect the failed wireless call.

6. The method of claim 1 further comprising the steps of:
determining whether a non-emergency number is dialed; and
determining whether a non-emergency retry should be invoked.

7. The method of claim 6 wherein the step of determining whether a non-emergency number is dialed further comprises the steps of:
comparing the dialed number and a list of emergency numbers; and
indicating a non-emergency number has been dialed when there is not a match between the dialed number and a number in the list of emergency numbers.

8. The method of claim 7 wherein the step of determining whether the non-emergency retry service should be invoked further comprises the steps of:
determining if a non-emergency retry service is enabled;
prompting a subscriber to record a message;
recording the message if the subscriber chooses to record a message; and
playing the message upon connection of the failed wireless call.

9. The method of claim 1 wherein the step of attempting to connect the failed wireless call further comprises the steps of:
dialing the dialed number until the wireless call is connected to a terminating party at the dialed number; and
ringing the mobile device when the wireless call is connected to the terminating party.

10. The method of claim 9 wherein the step of ringing the mobile device further comprises the step of continually ringing the mobile device until the subscriber answers the wireless call.

11. The method of claim 9 wherein the mobile device stores a default message and further comprising the steps of:
playing the default message in response to the wireless call being connected to the terminating party; and
playing a recorded message from a subscriber of the mobile device to the terminating party.

12. A mobile device for placing a wireless call comprising:
a user interface for inputting a dialed number by a subscriber;
a call failure detector for determining whether the wireless call to the dialed number failed;
a comparator for comparing a list of emergency numbers to the dialed number and for determining whether the dialed number is one of the list of emergency numbers;
a call retry service detector for determining whether a call retry service is enabled;
wherein the call retry service detector further comprises an emergency retry service detector for determining whether the emergency retry service is enabled;
an emergency retry service rejection detector for prompting whether a subscriber of the mobile device wishes to reject the emergency retry service and for determining whether the emergency retry service is rejected; and
a wireless call generator for repeatedly generating a wireless call to the dialed number in response to the call retry service detector.

13. The mobile device of claim 12 further comprising:
an emergency call memory for storing a list of emergency numbers.

14. The mobile device of claim 13 further comprising:
wherein the call retry service detector comprises a non-emergency retry service detector for determining whether a non-emergency retry service is enabled.

15. The mobile device of claim 12 further comprising;
a message recorder for recording a recorded message by the subscriber;
a message memory for storing the recorded message; and
a message player for repeatedly playing the recorded message when the wireless call is connected to the dialed number.

16. The mobile device of claim 12 further comprising:
a default message recorder for recording a predetermined default message;
a default message memory for storing a default message; and
a default message player for repeatedly playing the default message when the wireless call is connected to the dialed number.

17. A system for attempting to connect a wireless call that has failed, the system comprising:
a mobile device for wirelessly calling a dialed number, for storing a list of emergency numbers, for comparing the list of emergency numbers to the dialed number and for determining whether the dialed number is one of the list of emergency numbers, for determining whether the wireless call to the dialed number has failed, for determining whether a call retry service is enabled, wherein said determining whether a call retry service is enabled further comprises determining whether an emergency retry service is enabled; for prompting, when the dialed telephone number is on the list of emergency number, the wireless call has failed, and the call retry service is enabled, whether a subscriber of the mobile device wishes to reject the emergency retry service and for determining whether the emergency retry service is rejected; and for automatically redialing the dialed telephone number when the dialed telephone number is on the list of emergency numbers, the wireless call has failed, and the call retry service is enabled; and
a wireless call receive system for receiving the wireless call from the mobile device.

18. The system of claim 17 wherein the mobile device further comprises:
a message recorder for recording a recorded message;
a message memory for storing the recorded message; and
a message player for repeatedly playing the recorded message when the wireless call is completed to the dialed number.

* * * * *